UNITED STATES PATENT OFFICE.

9468X

WILLIAM P. CANNON, OF MONROE COUNTY, TENNESSEE.

IMPROVEMENT IN PLOWS.

Specification forming part of Letters Patent dated March 4, 1836.

*To all whom it may concern:*

Be it known that I, WM. P. CANNON, of the United States, and county of Monroe, and State of Tennessee, have invented a new and useful Improvement in Bar-Share Plows; and I do hereby declare that the following is a full and exact description thereof.

For a medium-sized plow the horizontal bar from point to heel is eighteen inches, bar two inches deep by one broad, heel-plate raised and mortised, as in the old bar-share plow. The point of the bar is beveled off on the top side, so as to coaptate the share-board, which is welded to it at this point. At the distance of twelve inches back from the point of the horizontal bar a perpendicular bar one and a half inch broad, one-half inch thick, and twenty inches long, having four or five holes mortised through the top, is riveted or attached by a screw and tap to the horizontal bar. At the distance of six inches from the rivet or screw common to both the horizontal and perpendicular bars the perpendicular bar is riveted to the share-board, having been previously twisted one-third to the left just below the point of junction, so as to receive the share-board evenly, and just above the junction of the share-board and perpendicular bar the bar is twisted one-third to the right, so as again to bring the broad side of each end of the bar on the same plane.

The "share-board" (so called because the share and mold-board are continuations of the same piece) is a plate of wrought-iron, which approaches in shape a rhomboid, having the end which forms the hind end of the mold-board a little the widest and slightly rounded. This plate, before attaching it to the bars, is gradually curved from the point to the second angle, at which point it is riveted to the upright bar. From this angle to the third angle or corner of the mold-board it is slightly curved downward, and from the third to the fourth angle it is so curved that, while the fourth angle rests on a plane with the horizon and is the corner of the share, the corner of the wing or third angle of the rhomboid is nearly perpendicular to the horizon. This plate, when correctly finished, is a regular and gentle curve, which has a regular and gradually twisted appearance from the point or first angle to the corner of the wing or third angle. This plate is welded on the bevel on the point of the horizontal bar and riveted on the plane side of the perpendicular bar between its twisted points. The distance from the point of the plow to the share-corner or fourth angle is ten inches. This is the cutting part and rests on a plane with the horizon. At this corner the share-board is seven inches across to the landside. From the fourth angle or share-corner it rises with a gentle curve upward and backward till it approaches near to a perpendicular at the corner of the wing. The distance between these corners is twelve inches. The distance from the second angle or bar-corner to the corner of the wing is twelve inches. The corner of the wing is inclined six inches backward from the rivet or bar-corner. The holes in the top of the bar are designed to receive a movable rivet or pin across the top of the beam to regulate the depth of the plow, as may be necessary.

The above is a description of a medium-size plow, and will require about twenty-five pounds of iron as material to make it of. The size may be varied by keeping up the same proportions, so as to make a small one-horse plow, which will weigh about seventeen pounds, or a large two, three, or four horse plow, weighing fifty-five or sixty pounds.

The depth of the plow is regulated by the movable rivet in the upper end of the perpendicular bar, the plow turning on the heel-screw.

This plow is stocked like the old gopher or shovel plow, only the left handle is one-fifth nearest the foot piece at top, and the heel-plate of the horizontal bar is secured to the foot by a screw-pin and tap. The beam is something longer than the shovel-beam, and is curved up where it is mortised longitudinally to receive the perpendicular bar. This bar-share plow differs from all others now in use in the horizontal bars being of the same size from the heel to the point or share-board, and in the perpendicular bar forming a part of the plow and regulating the depth of the plow by the movable rivet across the top of the beam instead of the rod-brace or false colter. It differs from the bar-share plows now in use in the share and wing being a continuous piece and having such a curve and twist that when once the earth or soil in which it is operating starts on the points of the plow it is compelled to pass off at the corner of the wing and has to pass over the whole length of the share-board while the plow passes through a space the distance of the perpendicular bar from the point of the plow. It differs in the share-board being lower, and therefore requires less power to draw it, and in the mode of regulating the depth of the plow by the holes in the upright bar. It differs in being so constructed that the shovel-stock, with the little alterations spoken of, is suitable to it. It differs in having a heel-plate to the horizontal bar instead of an eye.

What I claim as my invention, and not previously known in the above-described plow, is—

The mortise heel-plate and screw on the horizontal bar, allowing the plow to be regulated in depth by turning on the heel-screw instead of the eye or socket, which rendered the plow stationary as to depth unless through the alteration of the horse-harness, and in discovering the propriety and first making of the mortises in the uprights or perpendicular bar, so as to fix the plow at any depth desirable by the movable rivet.

WM. P. CANNON.

Witnesses:

R. F. COOKE,
SILAS PERRY.